(12) United States Patent
Koestler et al.

(10) Patent No.: US 8,474,568 B2
(45) Date of Patent: Jul. 2, 2013

(54) SPRING DEVICE AT A SWIVELABLE HATCH OF A MOTOR VEHICLE

(75) Inventors: Ulrich Koestler, Hebertshausen (DE); Arne Koehler, Muenlch (DE); Christoph Ulrich, Kratzenburg (DE); Nadja Kaiser, Koblenz (DE)

(73) Assignee: Stabilus GmbH, Koblenz (DE)

( * ) Notice: Subject to any disclaimer, the term of this patent is extended or adjusted under 35 U.S.C. 154(b) by 114 days.

(21) Appl. No.: 13/155,967

(22) Filed: Jun. 8, 2011

(65) Prior Publication Data

US 2011/0297471 A1 Dec. 8, 2011

(30) Foreign Application Priority Data

Jun. 8, 2010 (DE) .................. 10 2010 029 816
Oct. 6, 2010 (DE) .................. 10 2010 042 015

(51) Int. Cl.
*B62D 25/10* (2006.01)
*B62D 25/12* (2006.01)
*B60R 21/34* (2011.01)
*B60R 21/38* (2011.01)

(52) U.S. Cl.
USPC ......... 180/274; 180/69.2; 180/69.21; 267/34; 267/127; 296/187.04

(58) Field of Classification Search
USPC .... 180/274, 69.2, 69.21; 296/187.04; 267/34, 267/64.11, 64.15, 113, 118, 120, 124, 126, 267/127
See application file for complete search history.

(56) References Cited

U.S. PATENT DOCUMENTS

| | | | |
|---|---|---|---|
| 3,235,303 A * | 2/1966 | McLeod et al. | 296/117 |
| 4,309,026 A * | 1/1982 | Reuschenbach et al. | 267/121 |
| 4,623,132 A | 11/1986 | Smith | |
| 5,131,512 A * | 7/1992 | Steinhilber et al. | 188/322.19 |
| 5,810,339 A * | 9/1998 | Kuspert et al. | 267/293 |
| 5,996,746 A * | 12/1999 | Turner et al. | 188/269 |
| 6,840,354 B2 * | 1/2005 | Grundwurmer et al. | 188/171 |
| 7,374,028 B2 * | 5/2008 | Fox | 188/322.14 |
| 7,931,111 B2 * | 4/2011 | Kim et al. | 180/274 |
| 7,946,376 B2 * | 5/2011 | Hayashi et al. | 180/274 |
| 2003/0020284 A1 | 1/2003 | Peter | |
| 2004/0100006 A1 * | 5/2004 | Kawahara | 267/118 |
| 2007/0267892 A1 * | 11/2007 | Scheuch et al. | 296/187.04 |
| 2008/0136140 A1 * | 6/2008 | Karlsson | 280/727 |
| 2009/0160109 A1 | 6/2009 | Matsubara et al. | |
| 2011/0011256 A1 | 1/2011 | Borg et al. | |

FOREIGN PATENT DOCUMENTS

| | | |
|---|---|---|
| DE | 3141295 | 4/1983 |
| DE | 3939118 | 5/1991 |
| DE | 3600845 | 8/1996 |
| DE | 19646939 | 5/1998 |

(Continued)

*Primary Examiner* — Ruth Ilan
*Assistant Examiner* — Darlene P Condra
(74) *Attorney, Agent, or Firm* — Cozen O'Connor

(57) ABSTRACT

A spring device at a swivelable hatch of a motor vehicle, having a gas spring and a helper spring between the body of the motor vehicle and the hatch. The hatch is a front hood which can be raised into a pedestrian protection position prior to an impact of a pedestrian on the front hood, by an actuator activated by a sensor device. The helper spring is preloaded with a preloading force which, in case of a malfunction in which the gas spring has no gas pressure or a reduced gas pressure, is sufficient to adjust the front hood into the raised pedestrian protection position and to hold the front hood in the raised pedestrian protection position prior to the impact.

13 Claims, 2 Drawing Sheets

FOREIGN PATENT DOCUMENTS

| | | |
|---|---|---|
| DE | 199 22 454 | 11/2000 |
| DE | 10144812 | 3/2003 |
| DE | 102 52 560 | 5/2003 |
| DE | 102 16 860 | 7/2004 |
| DE | 103 25 351 | 12/2004 |
| DE | 10355444 | 6/2005 |
| DE | 10 2005 034 557 | 2/2007 |
| EP | 2096007 | 9/2009 |
| JP | 2003/034227 | 2/2003 |
| JP | 2007/010082 | 1/2007 |
| WO | WO 2009/122080 | 10/2009 |

* cited by examiner

Fig. 1
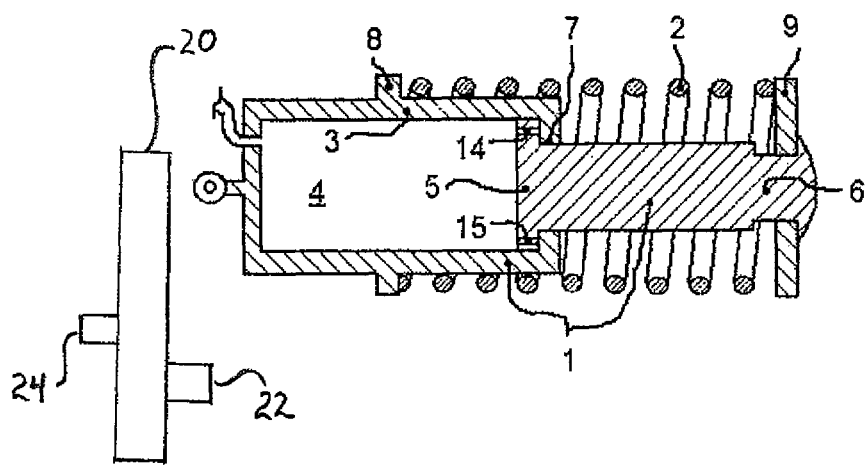
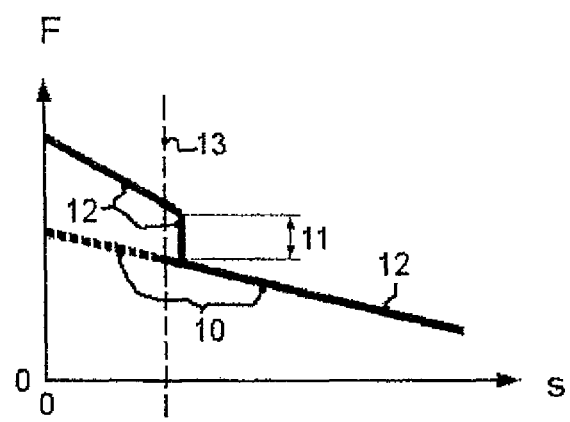
Fig. 2

Fig. 3
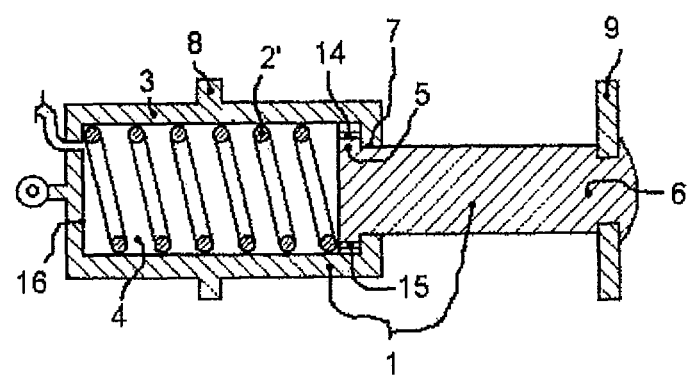
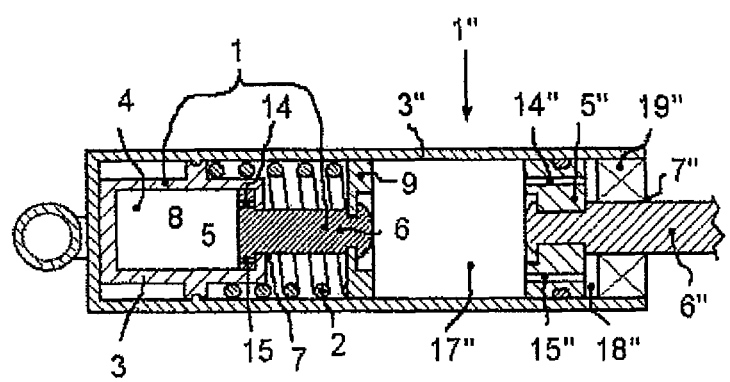
Fig. 4

SPRING DEVICE AT A SWIVELABLE HATCH OF A MOTOR VEHICLE

BACKGROUND OF THE INVENTION

1. Field of the Invention

The invention is directed to a spring device at a swivelable hatch of a motor vehicle.

2. Description of the Related Art

In DE 36 00 845 A1, for example, a spring device of the type mentioned above is provided at a rear hatch of a motor vehicle and has a gas spring and a preloaded helper spring between the body of the motor vehicle and the rear hatch. The work stroke of the gas spring is selected in such a way that when closing the opened rear hatch the gas spring reaches its fully retracted position before the rear hatch is closed. The preloading of the helper spring is selected in such a way that it is greater than or equal to the ejection force of the fully retracted gas spring. After the gas spring has reached its fully retracted position and has come into contact with the preloaded helper spring, the helper spring is further compressed as the rear hatch is closed further until the helper spring reaches a middle length measurement. This has the advantage, e.g., when driving over bumps, that the gas spring does not carry out movements which impair stability. Possible elastic deformations of the body of the motor vehicle or of the rear hatch are compensated for by the compressed helper spring. After unlocking a lock of the rear hatch, the gas spring and the helper spring cause the rear hatch to open until reaching a pre-closing position which is close to the closed position and in which the helper spring has reached its maximum length which is defined by a stop. Subsequently, only the gas spring causes a complete opening of the rear hatch or assists in manual opening of the rear hatch. In this spring device, the preloading force of the helper spring substantially exceeds the gas force of the completely retracted gas spring so that a manual closing of the rear hatch is difficult or not readily possible. Therefore, additional, force-actuated locking elements are provided that enable a force-actuated closing of the rear hatch from the pre-closing position to the closed position and, to this end, require closing the rear hatch in several stages. Further, the force-actuated locking elements considerably increase the manufacturing effort and cost of the spring device.

SUMMARY OF THE INVENTION

It is an object of one embodiment of the invention to provide a spring device at a swivelable hatch of a motor vehicle that can hold the front hood in the raised pedestrian protection position before an impact, e.g., of a pedestrian on the front hood in case of a malfunction in which the gas spring has no gas pressure or reduced gas pressure.

Owing to the fact that the hatch is a front hood that can be raised into a pedestrian protection position prior to an impact, e.g., of a pedestrian on the front hood, by an actuator which can be activated by a sensor device and the helper spring is preloaded with a preloading force which, in case of a malfunction in which the gas spring has no gas pressure or reduced gas pressure, is sufficient to hold the front hood in the raised pedestrian protection position prior to impact, it is ensured in case of an accident-related impact, e.g., of a pedestrian on the front hood, that the front hood is in an optimal position for absorbing the impact. A suspension and/or damping device arranged under the front hood can then absorb the impact as provided by design in such a way that, for example, the pedestrian impacting with the front hood is not injured or, if so, not severely. The construction cost for the suspension device is small and requires only a fairly slight preloading of the helper spring, which can have a flat characteristic so that after being raised into the pedestrian protection position the front hood can be manually adjusted effortlessly back into the closed position or starting position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described more fully with reference to drawings. The drawings show: In the drawings.

FIG. 1 is a first embodiment example in a simplified cross section through a spring device having a helper spring that encloses a gas spring and loads it in its maximum extended position;

FIG. 2 is a representative simplified force-path diagram of the constructional unit formed by the gas spring and the helper spring;

FIG. 3 is a second embodiment example in a view corresponding to FIG. 1; and

FIG. 4 is a third embodiment example in a cross section through the gas spring that can adjust a swivelable front hood of a motor vehicle into the pedestrian protection position and, during normal opening, can adjust the front hood at least partially in direction of a maximum open position.

DETAILED DESCRIPTION OF THE PRESENTLY PREFERRED EMBODIMENTS

A first embodiment example of a spring device having a gas spring 1 and a helper spring 2 enclosing the gas spring 1 which are combined to form a constructional unit is shown schematically in cross section in FIG. 1. The spring device is arranged at a swivelable front hood 20 of a motor vehicle. For this purpose, an axially outer area of a cylinder 3 of the gas spring 1 is connected to the front hood 20. The cylinder 3 is shown incompletely and schematically in the drawing.

In a hollow space 4 under pressure, the gas spring 1 has an axially adjustable piston 5 that is connected at a front side to a piston rod 6, which projects outward through an axial opening 7 in the cylinder 3. The piston 5, which is constructed as a differential pressure piston, divides two work spaces of the cylinder 3, which are jointly under pressure and are connected via axial throttle openings 14, 15 in the piston 5.

The helper spring 2, which is under pressure by a predetermined preloading and is a metal coil spring 2 in the embodiment example, loads the piston 5 and the piston rod 6 connected to the latter in the axial position, shown in FIG. 1, in which the piston rod 6 occupies its maximum extended end position corresponding to the pedestrian protection position in the embodiment example. The helper spring 2 is supported axially at a supporting shoulder 8 at the cylinder 3 on one side and at a washer 9 fastened to the projecting end of the piston rod 6. The washer 9 has dimensions conforming to the DIN standard, for example.

Assisted by the gas spring 1 and the preloaded helper spring 2, the front hood, not shown, can be raised into a pedestrian protection position prior to an impact of a pedestrian on the front hood by an actuator 22 which can be activated by a sensor device 24.

When the actuator 22, preferably a pyrotechnic actuator, has adjusted the front hood 20 upward into its raised pedestrian protection position, or beyond it temporarily, it quickly loses its force. In particular, it is not capable of holding the front hood 20 in its pedestrian protection position before a subsequent impact of a pedestrian on the front hood 20.

The gas spring 1 and the helper spring 2 are provided for this purpose and, after the front hood 20 is moved into the pedestrian protection position, hold the front hood 20 in the pedestrian protection position, since a suspension device and/or damping device located under the front hood 20 and which can also be formed by, at least along with, the actuator 22 can absorb the impact—as provided by design—in a particularly favorable manner. In so doing, injuries can be prevented or substantially reduced.

In case of malfunction, for example, after several years, the gas spring 1 may have no gas pressure or reduced gas pressure. However, in order that the front hood 20 is raised into the pedestrian protection position by the actuator 22 so that it is in its pedestrian protection position prior to a subsequent impact of a pedestrian on the front hood 20 even in case of malfunction, the helper spring 2 according to FIG. 2 has a sufficient preloading force that the helper spring 2 can hold the front hood 20 in the raised pedestrian protection position by itself before the assumed impact. In FIG. 2, the vertical path s of the front hood 20 from the closed position to the pedestrian protection position is equal to zero (0) when the front hood 20 is closed normally and is fixed at least in the raised position, for example, by at least one front hood lock.

Numerous publications, e.g., EP 2 096 007 A1, describe how a closed front hood provided with a pedestrian protection device can be adjusted into an approximately raised pedestrian protection position at least in some areas, e.g., in the area of at least one rear hinge.

A pedestrian protection device which is at least approximately comparable is also used in the embodiment example, wherein the gas spring 1 and the helper spring 2 are used in addition.

When functioning as intended, the gas spring 1 is operative from the closed position of the front hood 20 at least to the pedestrian protection position of the front hood, and the gas spring 1 has a force curve, e.g., the linear force curve 10 in FIG. 2, which decreases linearly or nonlinearly as the height position of the front hood increases. The helper spring 2, which is arranged coaxial to, in principle parallel to, the gas spring 1, is preloaded by a preloading force 11 when the piston rod 6 of the gas spring 1 is at maximum extension. The constructional unit comprising the gas spring 1 and the helper spring 2 has the characteristic curve 12 indicated in FIG. 2 by a continuous line with two kinks. The characteristic curve 12 runs vertically between the two bends, and the difference in height of the two bends corresponds to the preloading force 11 of the helper spring 2 when the piston rod 6 is extended from the cylinder 3 to the maximum extent as is shown in FIG. 1.

In the embodiment example, the preloading force 11 is selected in such a way that the helper spring 2 can hold the front hood 20 in the pedestrian protection position by itself before the indicated accident-related impact in the event of a malfunction in which the gas spring 1 has no gas pressure or reduced gas pressure.

In FIG. 2, the pedestrian protection position of the front hood is indicated by a vertical broken line 13. It can be seen from the position of this line 13 with respect to the characteristic curve 12 of the constructional unit comprising the gas spring 1 and the helper spring 2 that the helper spring 2 is somewhat retracted in the pedestrian protection position compared to its maximum extended position shown in FIG. 1 and is therefore compressed to a somewhat greater extent than is required for securing the pedestrian protection position. The position of line 13 could also be shifted to the left or to the right, referring to FIG. 2, at most until the vertical jump in the characteristic curve 12.

The forces of the gas spring 1 and helper spring 2 that load the front hood upward in the pedestrian protection position must, of course, be taken into account in the forces which act on, or can act on, the pedestrian in an impact of the pedestrian on the front hood.

It can further be seen from FIG. 2 that the helper spring 2 is operative from the closed position s=0 at least to the pedestrian protection position 13 of the front hood and has a force curve which decreases linearly in the embodiment example as the height position of the front hood increases and which could also optionally extend nonlinearly as an alternative.

It can further be seen from FIG. 2 that the gas spring 1 and the helper spring 2 have a flat force curve depending on the height position of the front hood, which allows or facilitates a manual displacement of the front hood back into the closed position after a displacement of the front hood into the pedestrian protection position 13.

FIG. 3 shows a second embodiment of a spring device at a swivelable hatch of a motor vehicle by which a front hood of a motor vehicle can be raised into a pedestrian protection position. The second embodiment has structural component parts comparable to those in the first embodiment example. To avoid redundancy in the description of structural component parts comparable to or identical to each other in the two embodiment examples, these structural component parts are provided with the same reference numeral and, referring to helper spring 2', with a superscripted symbol.

The essential difference between the second embodiment and the first embodiment is that the helper spring 2' in the second embodiment is arranged in a work space of the cylinder 3 and is supported axially at the piston 5 on one side and, on the other side, at a supporting wall 16 formed at the cylinder 3. In this embodiment, the supporting wall 16 is formed by the base of the hollow space 4 in the cylinder 3.

A third embodiment of the invention is shown in FIG. 4 in cross section through a gas spring 1" having a piston 5" is axially displaceable in a cylinder 3" and a piston rod 6" that projects outward from the piston 5" through an axial through-opening 7" in the cylinder 3". The through-opening 7" is formed in a guiding and sealing assembly 19" which guides the piston rod 5" and seals the cylinder 3" at this front side. The gas spring 1" is fastened in an articulated manner either to the body by its cylinder 3" or its piston rod 6" or to a structural component part connected to the latter so as to be swivelable around at least a real or an ideal swiveling axis. The other part, i.e., the piston rod 6" or the cylinder 3", is fastened in an articulated manner to the front hood of a motor vehicle or to an element connected thereto so as to be swivelable around at least a real or an ideal swiveling axis.

At least one throttle opening 14", 15" is formed in the piston and allows fluid which is located in the work spaces 17", 18" under pressure to pass from a work space 17" or 18" into the other work space 18" or 17" of the cylinder 3" in a throttled manner. The fluid is formed, for example, by air. In the embodiment example, the piston 5" acts as a differential pressure piston. The gas spring 1" can raise a swivelable front hood, not shown, of a motor vehicle immediately from a closed position into a pedestrian protection position by itself or together with at least one other gas spring when a sensor device has detected an occurring or imminent impact of a pedestrian on a vehicle part and has unlocked or released two adjusting parts of an adjustment mechanism of the front hood which are displaceable relative to one another and are normally locked with one another or connected to one another.

Further, during normal opening the gas spring 1" can adjust the front hood at least partially in the direction of a maximum open position of the front hood by itself or together with at least one additional gas spring.

In the third embodiment example, a constructional unit having essentially an additional cylinder 3, in which a piston 5 connected to a piston rod 6 is axially displaceable, and a helper spring 2 is inserted into the work space 17" of the gas spring 1". The helper spring 2 partially encloses the piston rod 6 and the cylinder 3 and is preloaded axially between an outer supporting shoulder of the cylinder 3 and a washer 9 which is fastened to the projecting head area of the piston rod 6. The piston 5 is accordingly loaded toward the right-hand side in the end position referring to FIG. 4. In this end position, the piston 5 contacts a base of the cylinder 3 so that the second work space of the cylinder 3 on the right-hand side in FIG. 4 is minimized.

In one embodiment, the constructional unit used in the work space 17" of the cylinder 1" essentially corresponds to the constructional unit shown in FIG. 1; only the fastening location of the cylinder 3 on the left-hand side in FIG. 1 and the line leading from the work space 4, e.g., into a storage or to a pump, are omitted. The piston 5 which is axially adjustable in the cylinder 3 divides two work spaces 4 of the cylinder 3 which contain a pressureless or pressurized fluid, for example, air.

The gas spring 1" when functioning as intended can raise the front hood, not shown, of a motor vehicle from the closed position into a pedestrian protection position and, when the front hood is opened normally, at least partially in direction of a maximum open position by itself or together with a comparable additional gas spring, for example.

The gas spring 1" has a force curve, for example, the linear force curve 10 in FIG. 2, that decreases linearly or nonlinearly as the height position of the front hood increases. The helper spring 2 which is arranged coaxial to, in principle parallel to, the gas spring 1" is preloaded by a preloading force 11 in FIG. 2 such that the helper spring 2 can raise the front hood into the pedestrian protection position and hold it in the pedestrian protection position by itself or together with another comparable gas spring 1" or together with the helper spring 2 associated with this gas spring in the event of an unforeseen failure of the gas spring 1" and, as the case may be, also in the event of an unforeseen failure of gas spring 1, e.g., after multiple years of use, in which the pressure in the work spaces 17", 18" of the gas spring 1" and, as the case may be, in work spaces 4 of gas spring 1, has decreased or is equal to zero. In so doing, the piston 5" or the piston rod 6" of the gas spring 1" is supported axially at least indirectly at the piston rod 6 or at the intermediate part 9 fastened to the latter.

Of course, other embodiments of the invention can be constructed so as to differ from the embodiment examples. The spring device can be used at a front hood of a motor vehicle and has a gas spring and a helper spring between the body of the motor vehicle and the front hood. The front hood can be raised into a pedestrian protection position prior to an impact, e.g., of a pedestrian on the front hood by an actuator which can be activated by a sensor device. The helper spring is preloaded with a preloading force which, in case of a malfunction in which the gas spring has no gas pressure or reduced gas pressure, is sufficient to adjust the front hood into the raised pedestrian protection position prior to the impact and to hold it in the raised pedestrian protection position. The helper spring can be any spring, e.g., a coil spring. The gas spring can be any gas spring which, as in the embodiment example, can act in a damping or non-damping manner in case of an accident-related impact on the front hood. When the helper spring is constructed as a coil spring, as in one embodiment, it can be supported axially at a supporting shoulder of the cylinder and/or at a supporting shoulder of the piston rod or at an intermediate part which is supported directly or indirectly at the supporting shoulder. The intermediate part can be a disk, for example, a washer or spring washer, e.g., with DIN dimensions. When functioning as intended, the gas spring 1 can be operative from the closed position of the front hood at least to the pedestrian protection position of the front hood and can have a force curve which decreases linearly or nonlinearly as the height position of the front hood increases. The helper spring can be operative from the closed position of the front hood at least into the pedestrian protection position of the front hood and can have a force curve that decreases linearly or nonlinearly as the height position of the front hood increases. The gas spring and the helper spring can have a flat force curve depending on the height position of the front hood, which allows or facilitates a manual displacement of the front hood back into the closed position after a displacement of the front hood into the pedestrian protection position. The gas spring and/or the helper spring can be formed by an individual gas spring and helper spring, respectively, or by a plurality of gas springs and helper springs, respectively, which are arranged, e.g., laterally across from one another, symmetric to an ideal center vertical longitudinal plane of the vehicle. The constructional unit which is inserted in a work space of the cylinder in the third embodiment and which essentially corresponds to the constructional unit in FIG. 1 could also be replaced in an analogous manner by the constructional unit in FIG. 3. Likewise, only one helper spring comparable in operation to one of the helper springs described above can be inserted into a work space of the gas spring which, e.g., can adjust, or at least assist in adjusting, the front hood at least partially into its maximum open position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A spring device arranged at a swivelable hatch configured as a front hood that can be raised into a pedestrian protection position by an actuator activated by a sensor device prior to an impact of a motor vehicle, comprising:
   a gas spring;
   a helper spring arranged between a body of the motor vehicle and the hatch that is preloaded with a preloading force which, in case of a malfunction in which the gas spring has one of no gas pressure and a decreased gas pressure, is sufficient to adjust the front hood into the raised pedestrian protection position and to hold the front hood in the raised pedestrian protection position.

2. The spring device according to claim 1, wherein the helper spring is a coil spring.

3. The spring device according to claim 2, wherein the gas spring has a piston that is axially displaceable in a cylinder and that divides the cylinder in two work spaces (4 or 17", 18") and which is connected to a piston rod that projects outward through an axial opening in the cylinder, the helper spring loads the piston rod of the gas spring in its maximum extended end position.

4. The spring device according to claim 1, wherein the gas spring has a piston that is axially displaceable in a cylinder and that divides the cylinder in two work spaces and which is connected to a piston rod that projects outward through an axial opening in the cylinder, the helper spring configured to load the piston rod of the gas spring in its maximum extended end position.

5. The spring device according to claim 4, wherein the helper spring one of:
   encloses one of at least one area of the cylinder and the piston rod of the gas spring and is supported axially on one side at a supporting shoulder of the cylinder and, at the other side, at one of the piston rod and an intermediate part that is one of directly and indirectly supported at the respective part or the helper spring and
   arranged in a work space of the cylinder and is supported axially on one side at the piston and, on the other side, at a supporting wall formed at the cylinder or connected to the cylinder.

6. The spring device according to claim 5, wherein the gas spring is configured to be operative from the closed position of the front hood at least into the pedestrian protection position of the front hood having a force curve that decreases one of linearly and nonlinearly as the height position of the front hood increases.

7. The spring device according to claim 6, wherein the helper spring is operative from the closed position of the front hood at least into the pedestrian protection position of the front hood having a force curve that decreases one of linearly and nonlinearly as the height position of the front hood increases.

8. The spring device according to claim 1, wherein the gas spring is configured to be operative from the closed position of the front hood at least into the pedestrian protection position of the front hood having a force curve that decreases one of linearly and nonlinearly as the height position of the front hood increases.

9. The spring device according to claim 8, wherein the gas spring and the helper spring have a flat force curve based on the height position of the front hood that facilitates a manual displacement of the front hood back into the closed position after a displacement of the front hood into the pedestrian protection position.

10. The spring device according to claim 1, wherein the helper spring is operative from the closed position of the front hood at least into the pedestrian protection position of the front hood having a force curve that decreases one of linearly and nonlinearly as the height position of the front hood increases.

11. The spring device according to claim 1, wherein one or more of the gas spring and the helper spring are formed by one of an individual gas spring and helper spring, and a plurality of gas springs and helper springs.

12. The spring device according to claim 1, wherein the gas spring adjusts the front hood at least partially in the direction of a maximum open position of the front hood during normal opening one of by itself and together with at least one additional gas spring and assists the normal opening of the front hood.

13. The spring device according to claim 12, wherein a constructional unit having a cylinder in which a piston connected to a piston rod is axially displaceable and a helper spring which is preloaded axially loads the piston in an axial end position in which the piston rod connected to the piston projects as far as possible out of the cylinder into the work space of the gas spring and is directed to the piston of the gas spring is inserted into the work space of the gas spring.

* * * * *